United States Patent
Teng

(10) Patent No.: US 7,196,509 B2
(45) Date of Patent: Mar. 27, 2007

(54) THERMOPILE TEMPERATURE SENSING WITH COLOR CONTOURING

(75) Inventor: Kong Leong Teng, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 82 days.

(21) Appl. No.: 10/947,926

(22) Filed: Sep. 23, 2004

(65) Prior Publication Data

US 2006/0062275 A1    Mar. 23, 2006

(51) Int. Cl.
*G01K 11/00* (2006.01)

(52) U.S. Cl. .................................................... 324/162

(58) Field of Classification Search ............... 374/120, 374/162, 137, 124; 250/330, 332, 353; 702/130, 702/134, 135, 136
See application file for complete search history.

(56) References Cited

U.S. PATENT DOCUMENTS

| | | | | |
|---|---|---|---|---|
| 4,737,917 A * | 4/1988 | Perron | ....................... | 700/205 |
| 4,896,281 A * | 1/1990 | Mack | ........................ | 702/134 |
| 5,526,148 A * | 6/1996 | Moffat et al. | ................. | 349/20 |
| 5,580,172 A * | 12/1996 | Bhardwaj et al. | ........... | 374/137 |
| 5,711,603 A * | 1/1998 | Ringermacher et al. | ....... | 374/5 |
| 5,914,661 A * | 6/1999 | Gross | ........................ | 340/600 |
| 5,980,123 A * | 11/1999 | Heifler | ...................... | 396/427 |
| 6,023,637 A * | 2/2000 | Liu et al. | .................... | 600/474 |
| 6,046,398 A * | 4/2000 | Foote et al. | ................ | 136/201 |
| 6,105,618 A * | 8/2000 | Blaney | ........................ | 138/89 |
| 6,335,478 B1 | 1/2002 | Chou et al. | ................. | 136/201 |
| 6,449,382 B1 * | 9/2002 | Ciccolo et al. | ............ | 382/103 |
| 6,942,377 B1 * | 9/2005 | Goldstein | ................... | 366/129 |
| 2002/0006683 A1 | 1/2002 | Kim et al. | .................... | 438/54 |
| 2002/0170589 A1 | 11/2002 | Hamamoto et al. | ......... | 136/225 |
| 2004/0021773 A1 * | 2/2004 | Hayakawa | .................. | 348/164 |
| 2004/0169144 A1 * | 9/2004 | Shibayama | .............. | 250/338.1 |

OTHER PUBLICATIONS

Fluke Ti30 Thermal Imager, Fluke Corporation, Everett, WA 98206 (1995-2006).*

* cited by examiner

*Primary Examiner*—Diego Gutierrez
*Assistant Examiner*—Megann E Vaughn

(57) ABSTRACT

A color contour of an object is displayed from information that is obtained using an array of thermopile sensors. A color contour of an object is generated by pre-establishing a relationship between IR radiation power and color, measuring the power of incident IR radiation emanating from different locations on the object, mapping the measured IR radiation powers to colors, and generating color contour information that can be displayed on a color display. The color contour information represents the temperature of an object at different locations.

2 Claims, 5 Drawing Sheets

| Voltage Range | Color | Equivalent Temperature (°C) |
|---|---|---|
| $V_a - V_b$ | Q | 90 – 100 |
| $V_b - V_c$ | R | 80 – 89 |
| $V_c - V_d$ | S | 70 – 79 |
| $V_d - V_e$ | T | 60 – 69 |
| $V_e - V_f$ | U | 50 – 59 |
| $V_f - V_g$ | V | 40 – 49 |
| $V_g - V_h$ | W | 30 – 39 |
| $V_h - V_i$ | X | 20 – 29 |
| $V_i - V_j$ | Y | 10 – 19 |
| $V_j - V_k$ | Z | 0 – 9 |

THERMOPILE TEMPERATURE SENSING WITH COLOR CONTOURING

BACKGROUND OF THE INVENTION

Thermopile sensors produce a voltage that is proportional to the power of the incident infrared (IR) radiation. Because all objects emit IR radiation, a thermopile can be used to measure the temperature of an object without directly contacting the surface of the object. FIG. 1 depicts an example of an individually packaged thermopile sensor 10 that includes a sensor element 12, a package 14, and connections leads 16.

The IR radiation that is detected by a particular thermopile sensor is a function of the view angle, $\phi$, of the thermopile sensor. FIG. 2A depicts a side view of a thermopile sensor 10 and its view angle relative to an object 20 of interest. For purposes of this description, the view angle and the distance, d, between the thermopile sensor and the object define the field of view 22 of the thermopile sensor relative to the object. FIG. 2B depicts a front view of the field of view from FIG. 2A relative to the object.

While thermopile sensors work well to detect the temperature of an object, their ability to provide temperature information is limited to the field of view of the particular device.

SUMMARY OF THE INVENTION

A color contour of an object is displayed from information that is obtained using an array of thermopile sensors. A color contour of an object is generated by pre-establishing a relationship between IR radiation power and color, measuring the power of incident IR radiation emanating from different locations on the object, mapping the measured IR radiation powers to colors, and generating color contour information that can be displayed on a color display. The color contour information represents the temperature of an object at different locations.

Because thermopile sensors generate a voltage in response to incident IR radiation, the relationship that is pre-established between IR radiation power and color is defined in terms of a voltage. For example, different voltage ranges are associated with different colors. The colors in turn are associated with different temperatures or temperature ranges in order to give temperature significance to the displayed color contour. The color and temperature association is arbitrary and may be made on an application-specific basis. As a result of the relationships between color and temperature, the temperature of an object can be graphically represented by a color contour.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION

A color contour of an object is displayed from information that is obtained using an array of thermopile sensors. A color contour of an object is generated by pre-establishing a relationship between IR radiation power and color, measuring the power of incident IR radiation emanating from different locations on the object, mapping the measured IR radiation powers to colors, and generating color contour information that can be displayed on a color display. The color contour information represents the temperature of an object at different locations.

Figure 1:
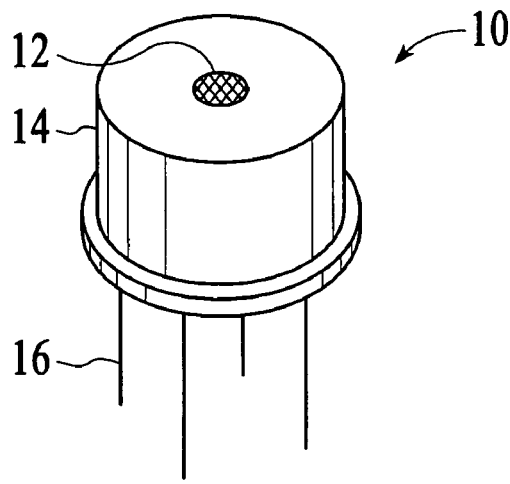
FIG. 1 depicts an example of an individually packaged thermopile sensor that includes a sensor element, a package, and connections leads as is known in the prior art.
Figure 2A:
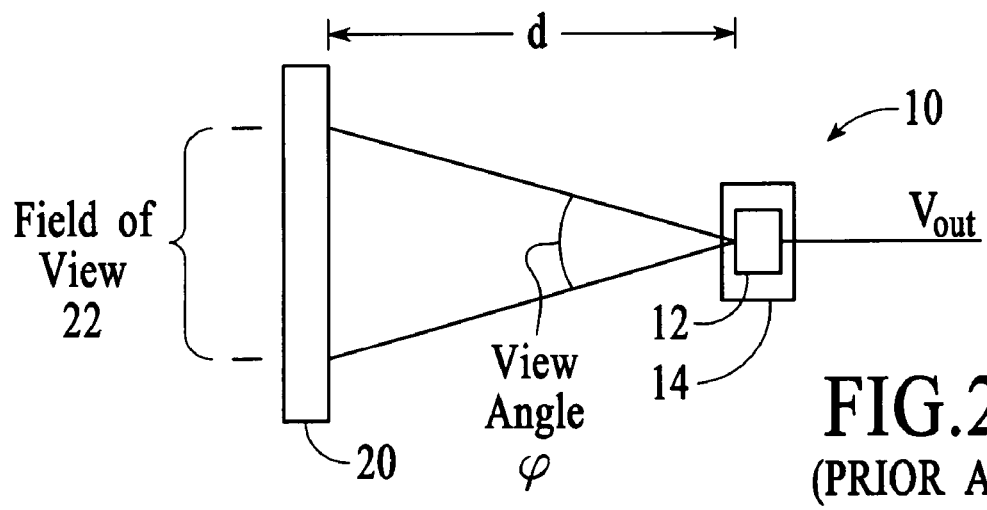
FIG. 2A depicts a side view of a thermopile sensor and its view angle relative to an object as is known in the prior art.
Figure 2B:
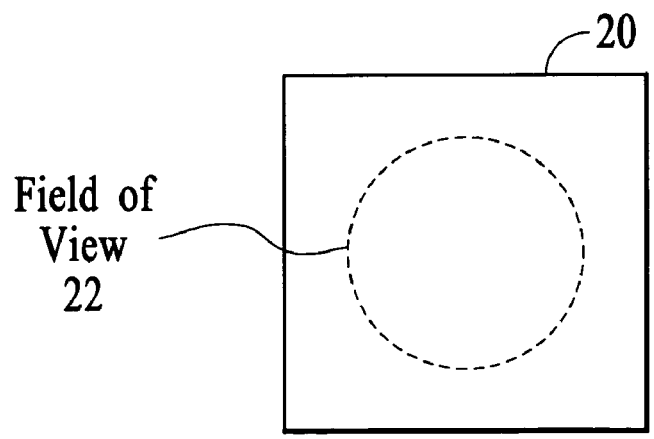
FIG. 2B depicts a front view of the field of view from FIG. 2A relative to the object as is known in the prior art.
Figures 3, 5:
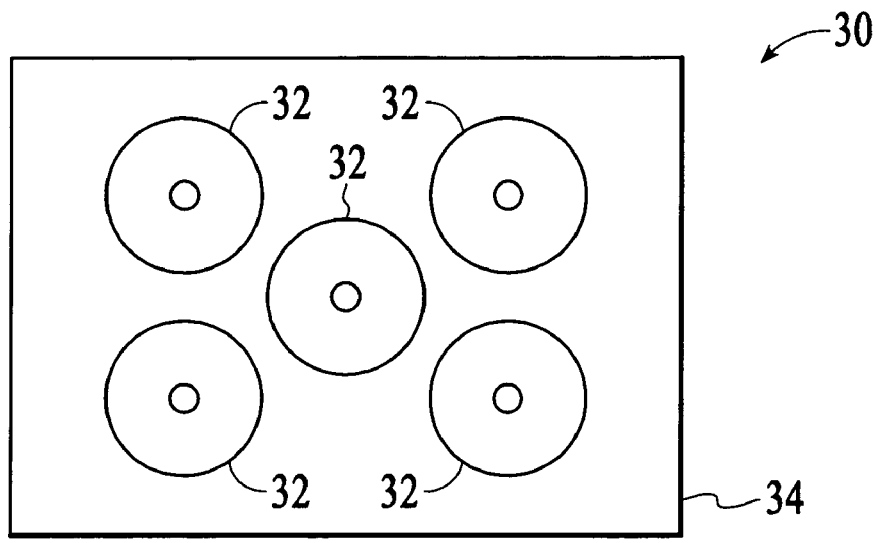
FIG. 3 depicts an array of thermopile sensors that is used to generate a color contour in accordance with an embodiment of the invention.
FIG. 5 depicts an example of a relationship between IR radiation power (represented here in terms of voltage ranges) and color.

FIG. 3 depicts an array 30 of thermopile sensors 32 that is used to generate a color contour. The thermopile sensors in the array are configured such that the fields of view of the individual thermopile sensors combine to form a larger field of view. In the embodiment of FIG. 3, the thermopile sensors are individually packaged thermopile sensors that are connected together into a sensor array structure 34. Although the thermopile sensors are described as individually packaged, the thermopile sensors could alternatively be integrated onto a single substrate, for example a semiconductor substrate. Additionally, while the number and orientation of the thermopile sensors are shown in FIG. 3 for example purposes, it should be understood that other numbers and orientations of thermopile sensors in an array are possible.

Figure 4A:
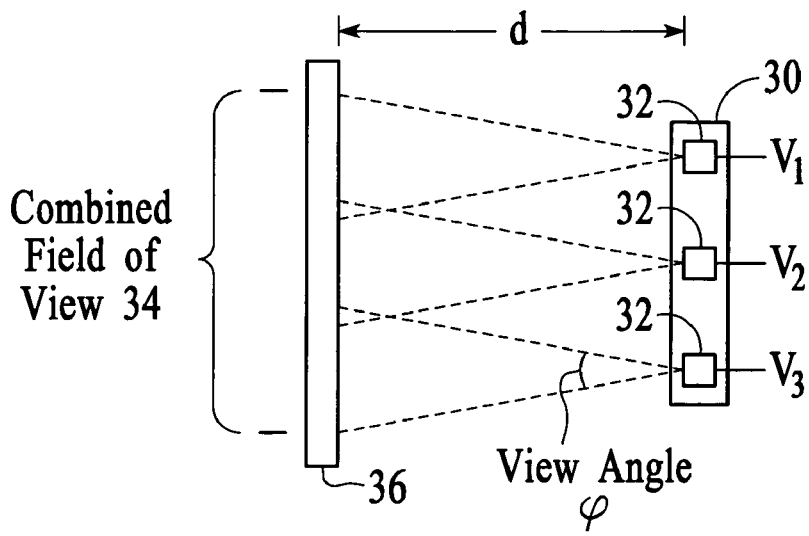
FIG. 4A depicts a side view of three thermopile sensors that are configured to form a combined field of view in accordance with an embodiment of the invention.

The field of view of individual thermopile sensors can be combined to form a larger field of view. FIG. 4A depicts a side view of three thermopile sensors 32 in an array 30 that are configured to form a larger field of view (referred to herein as the combined field of view 34) relative to an object 36. In the example of FIG. 4A, the combined field of view includes a slight overlap of the individual fields of view of the different thermopile sensors. The size of the combined field of view relative to an object and the amount of overlap between the individual fields of view are a function of the view angle, $\phi$, of the thermopile sensors and the distance, d, between the thermopile sensors and the object.

Figure 4B:
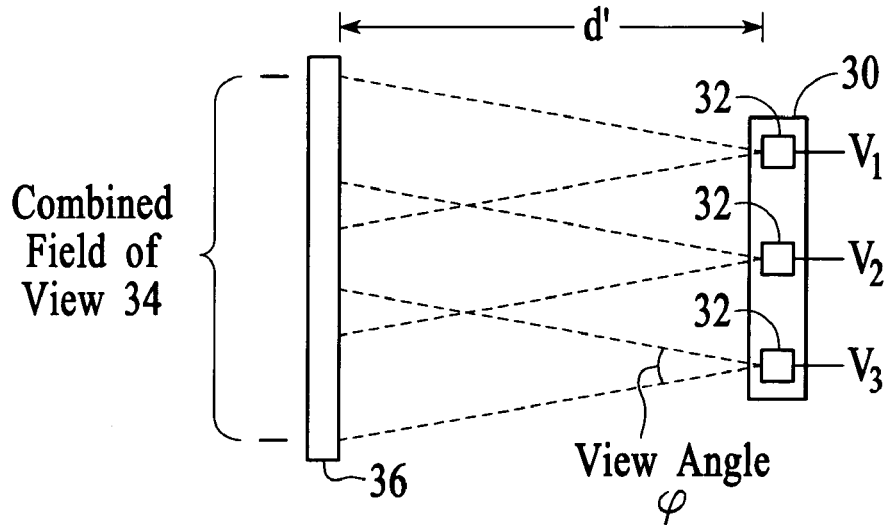
FIG. 4B depicts a side view of three thermopile sensors, where the distance between the thermopile sensor array and the object is greater than in FIG. 4A.
Figure 4C:
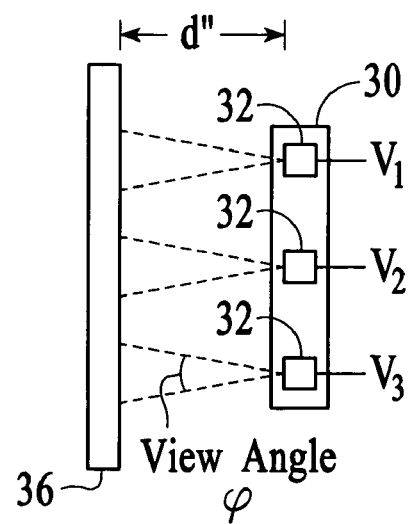
FIG. 4C depicts a side view of three thermopile sensors, where the distance between the thermopile sensor array and the object is less than in FIG. 4A.

Given the configuration of FIG. 4A, as the distance between the thermopile sensor array 30 and the object 36 increases (with the view angle fixed), the size of the combined field of view increases and the amount of overlap between the individual fields of view increases. The increase in the combined field of view and the amount of overlap that results from an increase in the distance between the thermopile sensor array and the object is illustrated in FIG. 4B (e.g., where d'>d). On the other hand, as the distance between the thermopile sensor array and the object decreases (with the view angle fixed), the combined field of view decreases. At some distance, the individual fields of view of the thermopile sensors no longer overlap and the combined field of view is not a continuous field of view, that is, there is no overlap between the individual fields of view as is the case in FIGS. 4A and 4B. An example of a decreased distance between the thermopile sensor array and the object is illustrated in FIG. 4C (e.g., where d"<d). In the example of FIG. 4C, there is no overlap of the fields of view of the individual thermopile sensors.

As described with reference to FIGS. 3 and 4A–4C, variables that determine the field of view of the thermopile sensor array include the number and configuration of the thermopile sensors, the view angle of the thermopile sensors, and the distance between the thermopile sensor array and the object. The specific values of the variables are selected based upon the specific application. In one example, the number of thermopile sensors in an array is a function of system cost requirements. More thermopile sensors typically translate to better resolution of the color contour. In an embodiment, overlap in sensor measurements can be accounted for using processing circuitry and/or a digital signal processor.

In accordance with the invention, a color contour of an object is displayed from information that is obtained using a thermopile sensor array. In an embodiment, a color contour of an object is generated by pre-establishing a relationship between IR radiation power and color, measuring the power of incident IR radiation emanating from different locations on the object, mapping the measured IR radiation powers to colors, and generating color contour information that can be displayed on a color display. The color contour information represents the temperature of an object at different locations.

Because thermopile sensors generate a voltage in response to incident IR radiation, the relationship that is pre-established between IR radiation power and color is defined in terms of a voltage. For example, different voltage ranges are associated with different colors. The colors in turn are associated with different temperatures or temperature ranges in order to give temperature significance to the displayed color contour. FIG. 5 depicts an example of a relationship between IR radiation power (represented here in terms of voltage ranges) and color. As depicted in FIG. 5, the voltage range of $V_a$–$V_b$ corresponds to a color Q, the voltage range of $V_b$–$V_c$ corresponds to a color R, and the voltage range of $V_c$–$V_d$ corresponds to a color S etc. FIG. 5 also identifies the temperature ranges that are associated with each color. For example, color Q is associated with the temperature range of 90° C.–100° C., color R is associated with the temperature range of 80° C. to 89° C., and color S is associated with the temperature range of 70° C. to 79° C. The color and temperature association is arbitrary and may be made on an application-specific basis. In an embodiment, generally accepted temperature and color relationships are used. For example, red can be used to represent relatively hot locations on an object and blue can be used to represent relatively cold locations on the object. As a result of the relationships between color and temperature as indicated in FIG. 5, the temperature of an object can be graphically represented by a color contour.

Figure 6:
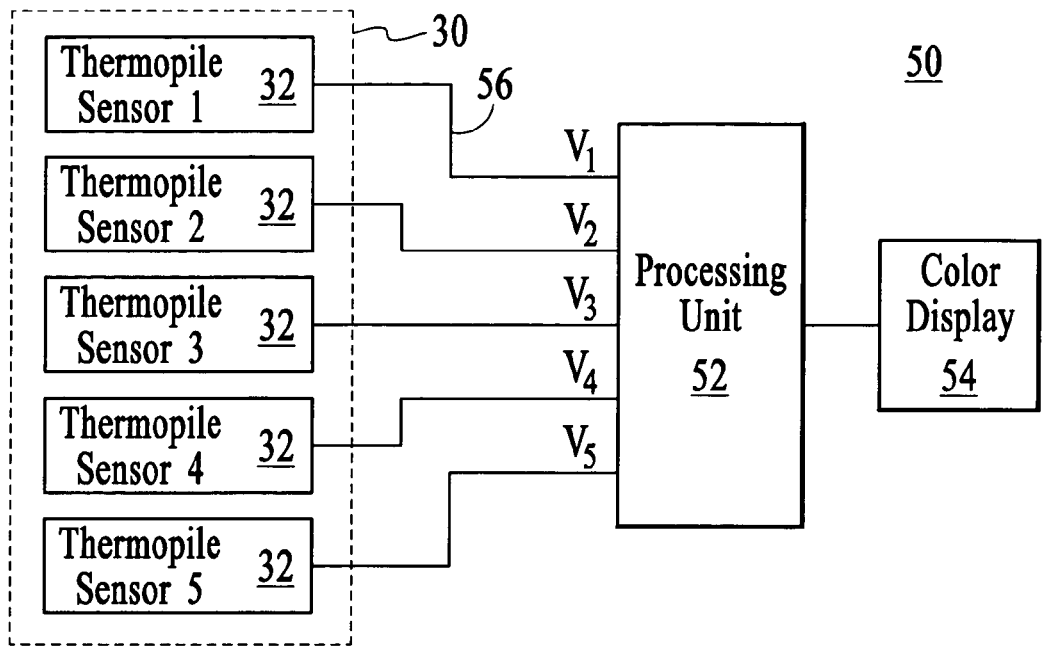
FIG. 6 depicts an embodiment of a temperature sensor system that is configured to provide color contouring in accordance with an embodiment of the invention.

FIG. 6 depicts an embodiment of a temperature sensor system 50 that is configured to provide color contouring. The temperature sensor system includes an array 30 of thermopile sensors 32, a processing unit 52, and a color display 54. The array of thermopile sensors includes individual thermopile sensors that output sensor-specific signals (e.g., $V_1$, $V_2$, $V_3$, $V_4$, and $V_5$) in response to incident IR radiation. The thermopile sensors are in signal communication with the processing unit through connections 56. The processing unit is configured to map the sensor-specific signals (e.g., voltages) that are provided by the thermopile sensors into display signals. The processing unit is pre-programmed with relationships of voltage to color (see FIG. 5) and with the relative locations of the thermopile sensors in the array. The processing unit may include any combination of hardware, software, and/or firmware. The display signals are provided to the color display for use in displaying a color contour that represents the temperature of an object at different locations.

In operation, the array 30 of thermopile sensors 32 is located near enough to an object of interest to detect the emitted IR radiation and measurements of the incident IR radiation power are obtained. In an embodiment, the thermopile sensors make simultaneous measurements of the incident IR radiation power and provide sensor-specific signals (e.g., $V_1$–$V_5$) to the processing unit 52. The sensor-specific signals generated by the thermopile sensors are provided to the processing unit in the form of voltages. The processing unit maps the measured voltages from each of the thermopile sensors to colors. The colors are then translated into display signals with location information that correspond to the location of the respective thermopile sensors. The display signals are then provided to the color display 54 for displaying a color contour of the object. Given the relationship between color and temperature, the color contour of the object represents the temperature of the object at different locations.

Figure 7:
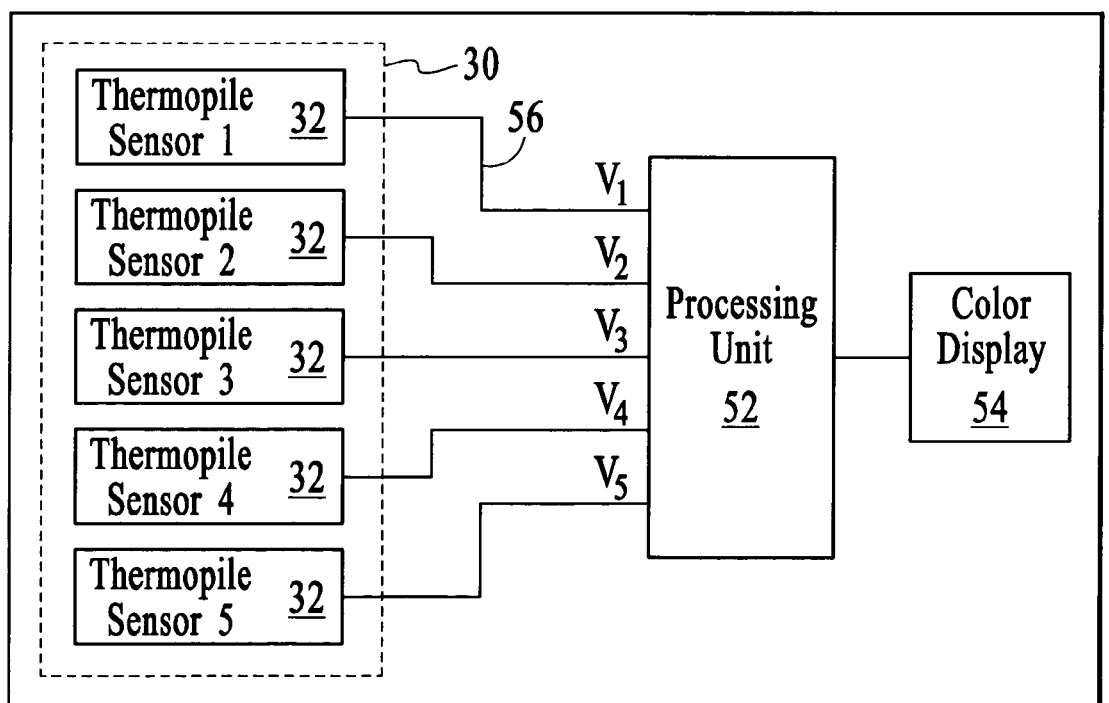
FIG. 7 depicts a temperature sensor system in which the thermopile sensor array, the processing unit, and the color display are integrated into a single hand-held device in accordance with an embodiment of the invention.

In the temperature sensor system of FIG. 6, the thermopile sensor array 30, the processing unit 52, and the color display 54 may be integrated in any fashion. For example, the thermopile sensor array and the processing unit may be integrated together (e.g., on the same circuit board) while the color display is separate. Alternatively, the thermopile sensor array, the processing unit, and the color display may be integrated into a single device such as a hand-held temperature imaging device. FIG. 7 depicts the thermopile sensor array, the processing unit, and the color display integrated into a single hand-held device 60 such as a hand-held temperature imaging device.

Figures 8, 9:
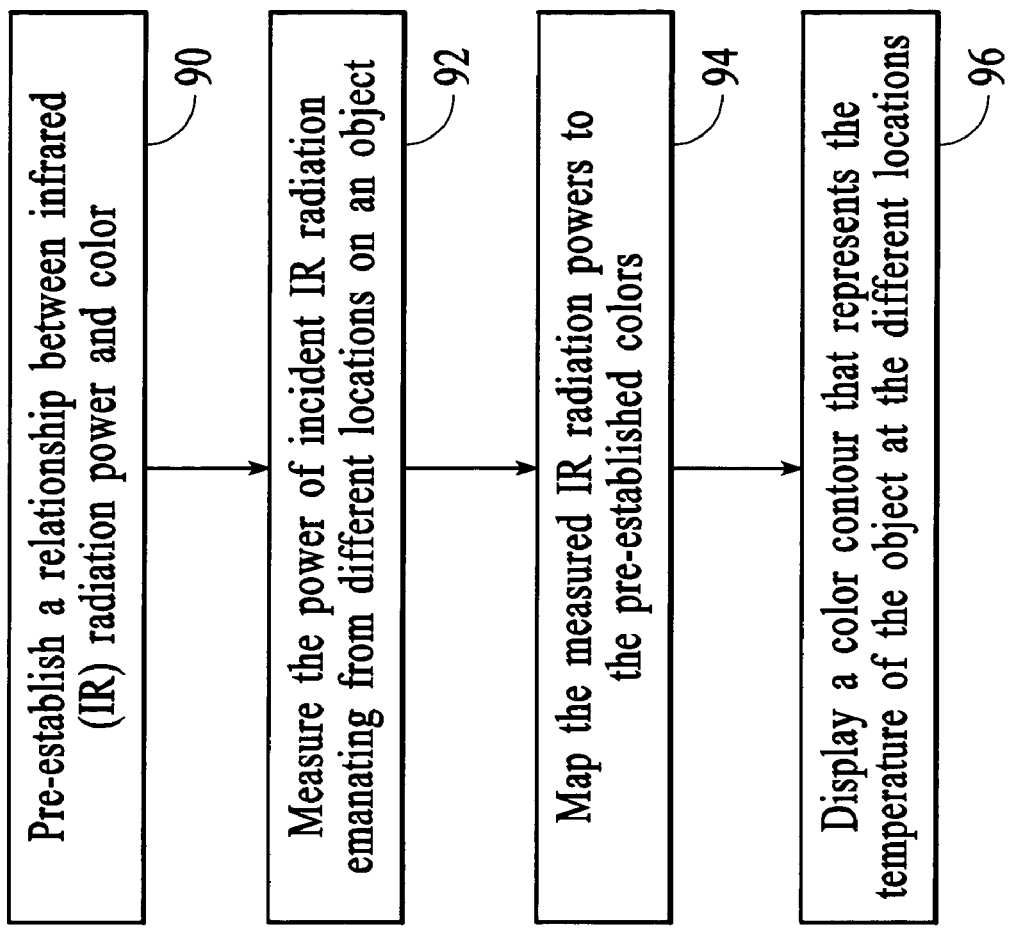
FIG. 8 depicts an example of a key that associates colors with temperature ranges.
FIG. 9 depicts process flow diagram of a method for communicating temperature information in accordance with an embodiment of the invention.

In an embodiment, the color and temperature relationship is externally provided in the form of a key. The key may be, for example, printed or electronically displayed. The key can be viewed in conjunction with the displayed color contour to identify temperature information related to an object. In one embodiment, the key is displayed on the color display simultaneously with the color contour. FIG. 8 depicts an example of a key 68 that associates colors with temperature ranges.

In an embodiment, the array of thermopile sensors performs best when the array and the object of interest are within a specific distance of each other. The preferred distance of operation is referred to herein as the "operational range." In an embodiment, the array of thermopile sensors are configured such that the fields of view of the thermopile sensors overlap to create a continuous combined field of view when the distance between the array of thermopile sensors and the object is within the operational range.

In an embodiment, the processing unit is programmable to allow for adjustments in the relationships between IR radiation power, voltage, color, and temperature. For example, the relationship between voltage and color can be adjusted to provide more or less color gradations. In an embodiment, the voltage input from the array of thermopile sensors is fed into an analog-to-digital converter. The resolution of the color contour is dependent in part on the bit resolution of the analog-to-digital converter. The digital data can be further processed by the processing unit 52, for example, to interpolate the overlap in sensor measurements.

Additionally, the temperature sensor system is described above as mapping voltages to colors. It should be noted that in an alternative embodiment, the voltages can be mapped to temperatures which are then mapped to colors. The particular mapping order is not critical as long as the IR radiation power is ultimately mapped to a color for color contouring.

FIG. 9 depicts process flow diagram of a method for communicating temperature information in accordance with an embodiment of the invention. At block 92, a relationship is pre-established between infrared (IR) radiation power and color. At block 94, the power of incident IR radiation emanating from different locations on an object is measured. At block 96, the measured IR radiation powers are mapped to the pre-established colors. At block 98, a color contour is displayed that represents the temperature of the object at the different locations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A temperature sensor system comprising:

an array of thermopile sensors, each thermopile sensor configured to have a different field of view and to produce a sensor-specific signal in response to the power of incident IR radiation from an object that is within the respective field of view; and a processing unit configured to receive the sensor-specific signals from the thermopile sensors and to generate color contour information that represents the temperature of the object at different locations;

wherein;

the thermopile sensors are configured to have overlapping fields of view relative to the object; and the processing unit is configured to interpolate sensor-specific signals in the overlapping fields of view.

2. The temperature sensor system of claim 1 wherein the processing unit is configured such that the pre-established relationships between voltage and color can be changed on an application-specific basis.

* * * * *